United States Patent [19]

LeGrand et al.

[11] Patent Number: 4,683,172

[45] Date of Patent: Jul. 28, 1987

[54] METHOD FOR MAKING SAFETY OR IMPACT RESISTANT LAMINATES

[75] Inventors: Donald G. LeGrand, Burnt Hills; William V. Olszewski, Stillwater, both of N.Y.

[73] Assignee: General Electric Company, Pittsfield, Mass.

[21] Appl. No.: 640,615

[22] Filed: Aug. 14, 1984

[51] Int. Cl.$^4$ ................. B32B 27/36; B32B 17/10
[52] U.S. Cl. ..................... 428/412; 428/415; 428/419; 428/425.6; 428/516; 428/517; 428/429; 428/447; 428/437; 428/442; 156/99; 156/103; 156/104; 156/106; 156/306.6
[58] Field of Search ........... 428/412, 429, 447, 437; 156/99, 103, 104, 106, 306.6

[56] References Cited

U.S. PATENT DOCUMENTS

| | | | |
|---|---|---|---|
| 3,664,910 | 5/1972 | Hollie | 428/916 X |
| 3,666,614 | 5/1972 | Snedeker et al. | 161/183 |
| 3,916,074 | 10/1975 | Knacksted et al. | 428/437 |
| 4,040,882 | 8/1977 | LeGrand | 156/106 |
| 4,130,684 | 12/1978 | Littell, Jr. et al. | 428/437 |
| 4,204,025 | 5/1980 | LeGrand | 428/409 |
| 4,204,026 | 5/1980 | LeGrand et al. | 428/409 |
| 4,368,087 | 1/1983 | Valimont et al. | 428/437 |

FOREIGN PATENT DOCUMENTS

| | | | |
|---|---|---|---|
| 0023313 | 3/1978 | Japan | 428/437 |
| 1101202 | 1/1968 | United Kingdom . | |
| 2015427 | 9/1979 | United Kingdom . | |

OTHER PUBLICATIONS

Product Specification Sheet of Flexcon Company for Flexmark OL-500-C.

*Primary Examiner*—P. C. Ives
*Attorney, Agent, or Firm*—William F. Mufatti; Michael J. Doyle; Martin Barancik

[57] ABSTRACT

Safety or impact resistant laminates which avoid the application of heat and excessive pressure in their construction comprising a plurality of laminae, at least one interlayer interposed between any two of the laminae, and a sufficient number of adhesive layers, at least one a contact or pressure sensitive adhesive, to bond all the laminae and interlayers.

5 Claims, No Drawings

METHOD FOR MAKING SAFETY OR IMPACT RESISTANT LAMINATES

This invention relates to safety laminates. More particularly, this invention relates to safety laminates bonded by the use of contact or pressure-sensitive adhesives. Safety laminates produced by the use of such adhesives avoid the cumbersome and expensive heat and pressure laminating techniques currently in use to produce transparent safety laminates and the like.

BACKGROUND OF THE INVENTION

Laminates containing flexible thermoplastic laminae and at least one sheet of interlayer material are well known. These laminates find particular utility in applications requiring transparency and strength as for example, in safety laminates such as safety glass for automobiles or penetration resistant laminates for theft protection.

Presently such laminates are laid-up and bonded with adhesive interlayers under elevated temperature and pressure. The bonding is conducted usually at temperatures ranging from about 80° C. to 205° C. and preferably from about 110° C. to about 140° C.; and at pressures of from about 2 to about 300 p.s.i., and preferably at pressures of from about 150 to about 250 p.s.i. The bonding is conducted in autoclaves, hydraulic presses, and similar devices. Needless to say, such bonding processes require great capital investment and labor which results in added cost to the finished laminate.

U.S. Pat. No. 3,666,614 discloses glass-resin multi-ply laminates made according to the above described method. Such laminates suffer from the labor and expense of their construction as well as residual stresses from heat bonding.

U.S. Pat. No. 4,204,025, assigned to the same assignee as the present invention, discloses a glass-adhesive interlayer interface to which a primer is applied to increase adhesion. The adhesive interlayer is an polydiorganosiloxane-polycarbonate block copolymer and the primer is a polyvinylidine chloride. This laminate requires the application of heat and pressure for bonding and is subject to the same deficiencies described above.

Thus, there exists a need for safety laminates for use in such applications as safety glass and penetration resistant laminates which are easily assembled at the temperature of intended use and which exhibit the necessary levels of adhesion and stability.

Therefore it is an object of the present invention to provide a safety laminate containing layers of contact or pressure sensitive adhesive.

It is another object of the present invention to provide a safety laminate, the construction of which eliminates the need to use elevated temperatures and excessive pressure.

It is yet another object of the present invention to provide a method for bonding safety laminates which employs a contact or pressure sensitive adhesive.

DESCRIPTION OF THE INVENTION

Briefly, according to the present invention there is provided a safety laminate having a plurality of laminae, at least one interlayer interposed between any two of the laminae, and a sufficient number of adhesive layers to bond all the laminae and interlayers of the laminate, at least one of which adhesive layers is a contact or pressure sensitive adhesive layer. Preferably, to facilitate construction of the laminate, the interlayers and all but one of the laminae should be flexible thermoplastic sheets and all adhesive layers should be contact or pressure sensitive adhesive layers. The remaining one lamina may be a rigid or flexible thermoplastic sheet or a glass sheet.

The rigid or flexible thermoplastic laminae of the present invention may be any of the common thermoplastics which are extrudable into film or sheet. Preferably the thermoplastic laminae are polycarbonate.

Any of the usual polycarbonate resins can be used for the thermoplastic laminae including but not limited to those described in U.S. Pat. Nos. 3,161,615, 3,220,973, 3,312,659, 3,312,660, 3,313,777, 3,666,614, among others, all of which are included herein by reference. Preferred polycarbonate resins are the aromatic polycarbonate resins.

Other suitable thermoplastic materials which may be used include acrylic and methacrylic polymers or copolymers; epoxy resins; phenylene ether based resins such as polyphenylene ether and blends of polyphenylene ether and styrene resins; polyaryl ethers; polyesters; polyethylene; polyphenylene sulfides; polyethermides; polysulfones; polyurethanes; ethylene polymers such as ethyl vinyl acetates; conductive plastics; and ordered aromatic copolymers, etc. These solid resinous materials can be formed into sheets.

A lamina or interlayer is "flexible" within the meaning of the present invention when it may be deformed, bent, or bowed so that air can be expelled as it is applied with a contact or pressure sensitive adhesive to a rigid or flexible second lamina or interlayer. The flexibility of a thermoplastic lamina is usually thickness dependent. Thus, a flexible lamina of the present invention may be of any thickness up to but excluding the thickness at which it is no longer sufficiently flexible as discussed above.

The glass which is to be employed encompasses all types of glass that have been commonly used in the preparation of glass laminates. Thus, the glass might be common plate glass, thermally tempered glass, chemically tempered glass, or other appropriate types. An example of the chemically tempered glass is that which has been treated chemically with salts in an ion-exchange type process to give a higher tensile and flexural strength glass. A glass treating process of this type is disclosed in U.S. Pat. No. 3,395,998. Tempered glasses are available commercially and are marketed by such companies, as Pittsburgh Plate Glass Company of Pittsburgh, Pa. (thermal tempered glass) and Corning Glass Works, of Elmira, N.Y. (chemically tempered glass). The lamina of the above described glass may be of any thickness required in the laminate.

The interlayer may be any of what are normally termed adhesive interlayers know to the art. These adhesive interlayers include the polyvinylbutyrals, ethylene terpolymers, epoxies, polyurethanes, silicones, acrylics, and ethylene acrylic acids, among others. Prefered interlayers have a thickness of from about 5 mils to about 60 mils and are flexible. An interlayer must not only be adhesively compatible with any adjoining lamina or adhesive layer but also, in the absence of protective means must be chemically compatible with a sensitive unprotected adjoining lamina or adhesive layer.

A particularly preferred interlayer material is the polycarbonate-polysiloxane block copolymer. These block copolymers essentially comprise recurring units consistihg of a polydiorganosiloxane interconnected by substituted aryloxy-silicon linkages to a polyester of carbonic acid precursor and a dihydric phenol. These block copolymers are described in U.S. Pat. No. 3,189,662 included herein by reference and can be used either alone as such or in conjunction with well known modifiers to provide particularly desired characteristics.

Illustrative of the above block copolymers is General Electric LR-3320. This material has a specific gravity of 1.12, a tensile strength of 2500 to 3900 psi; an elongation of 230–430%; a tear strength (Die C) of 400 lbs./in.; and a brittleness temperature below −76 ° F.; and a heat deflection temperature (10 mils under 66 psi Load) of 160° F.

Another such block copolymer, specifically General Electric LR-5530, has a specific gravity of 1.07; a tensile strength of 2200 to 2500 psi; an elongation of 500–700%; a tear(Die C) of 200 lbs./in.; and a brittleness temperature below −76 ° F.; and a heat deflection temperature (66 psi) of 130° F.

In the broad scope of the present invention, not all adhesive layers are contact or pressure sensitive adhesive layers additionally; some of the above described interlayers may function in their normal role as adhesive interlayers. However, in order to retain the advantages of a laminate bonded at ambient temperatures and below, then such other adhesive layers are preferably capable of effecting a bond at these temperatures. Suggested for use as such adhesive layers are self cure adhesives, rf cure adhesives, microwave cure adhesives, and particularly the UV cure adhesives, such as photosensitized epoxies or acrylates. Other examples of all such adhesives are known to those skilled in the art.

Pressure sensitive or contact adhesives suitable for use in the present invention must provide for good adhesion, cohesion, and tack as well possess, excellent optical clarity. Furthermore, the adhesive must maintain this clarity, adhesion, and cohesion on exposure to oxygen and sunlight during prolonged periods of outdoor use. Presently, suitable pressure sensitive adhesives are thermoplastic or crosslinked polymers for example styrene-diene based polymers such as, styrene-butadiene copolymers or styrene-isoprene-styrene copolymers; ethylene based polymers such as, ethyl vinyl acetate copolymers and ethyl vinyl acetate acid terpolymers; and acrylic based polymers, such as 2-ethyl hexyl acrylate copolymerized with a small amount of acrylamide. Preferably, the adhesive is lightly cross-linked.

The pressure sensitive adhesive may be formed by any common method known in the adhesives industry, such as, methods involving a solvent, a hot melt, a UV cure, an aqueous emulsion or others. Although great progress is presently being made to improve the tack, cohesion, and adhesion of pressure sensitive adhesives produced by any of the above methods, the solvent borne adhesives are still preferred because of their physical properties.

The preferred pressure sensitive adhesives are the acrylic based polymers made by the free radical polymerization of primarily acrylate ester monomers. Often, these polymers contain minor portions of other non-acrylic comonomers, which enhance certain physical or performance properties of the polymer or provide reactive sites for cross-linking. Thus, the term "acrylic" herein refers to the spectrum of pressure sensitive polymers containing acrylate as well as lesser portions of non acrylate monomers. Typically, the acrylate pressure sensitive adhesives are a copolymer of a higher alkyl acrylate copolymerized with a lesser portion of a polar comonomer. Suitable polar comonomers are acrylic acid, acrylamide, maleic anhydride, diacetone acrylamide, and long chain alkyl acrylamides.

Also present in the contact or pressure sensitive adhesive may be tackifiers, plasticizers, fillers, antioxidants, and ultraviolet light screens. These additives must be selected to be compatible with adjoining substrates or layers unless appropriate protective measures are taken. Particularly these additives must be compatible with thermoplastic polycarbonate resins.

The preferred adhesive contains an ultraviolet light screen. Ultraviolet light may degrade both the adhesive and the substrate such as a polycarbonate substrate to which the adhesive is adhered. Some non-limiting examples of suitable ultraviolet light absorbing compounds are benzophenone derivatives such as 2,2'-dihydroxybenzophenone, 2,2'-dihydroxy-4,4'-dimethoxybenzophenone, 2,2'-dihydroxy-4,4'-diethyoxybenzophenone, 2,2'-dihydroxy-4,4'-dipropoxybenzophenone, 2,2'-dihydroxy-4,4'-dihydroxy-4,4'-dibutoxybenzophenone, 2,2'-dihydroxy-4-methoxy-4'-propoxybenzophenone, and the like; benzotriazole derivatives such as 2-(2'-hydroxy-5'-methylphenyl)-benzotriazole, 2-(2'-hydroxy-3'-methyl-5'-tert-butylphenyl) benzotriazole, and the like.

Illustrative of suitable contact or pressure sensitive adhesives is the V-22 adhesive manufactured by FLEXcon Company of Spencer, MA. This adhesive material is an ultra clear thermoset acrylic copolymer having good water and humidity stability. It may be obtained as a polyester reinforced sheet with a release liner on both sides for two sided bonding or precoated or applied to polycarbonate film.

The laminates of the present invention may be constructed as a continuous sheet or in individual batches. For example, a roll tacking process could be used to produce a continuous laminate by passing continuous laminae, interlayers and adhesive layers arranged in the desired order between two rollers preset to apply a proper tacking pressure. A batch press process could be used to construct laminates by tacking the laminae together as single sheets in the proper order. The major requirements of such processes are that sufficient pressure be applied so as to properly adhere the pressure sensitive adhesive and that the laminae, interlayers, and adhesive layer be brought into contact in such a way as to expel the air between them.

Flexible laminae, interlayers, and adhesive layers facilitate the construction of the laminate by allowing the surfaces to be joined in such a manner as to expell air. In order to avoid the joining of a rigid lamina to a second rigid lamina and the associated problems with air pockets, it is preferred that only one lamina of the laminate be rigid.

To minimize the formation of air bubbles between the laminae, interlayers, and adhesive layers, a thin film of a water solution of a surfactant such as soap may be applied to each interface during bonding. Typically, the surfactant is less than 1% of the solution.

The contact or pressure sensitive adhesive need not be assembled into the laminate as a separate sheet. For example, the adhesive layer may be adhered in solvent borne or melt form to one of the laminae or interlayers in a separate processing step. The lamina or interlayer thus bonded to the contact or pressure sensitive adhesive would adhere to an adjoining interlayer or lamina upon contact. Such prebonding enables the use of thinner adhesive layers.

A preferred embodiment of the present invention is one in which all laminae have situated there between an interlayer and all laminae and interlayers are bonded at each interface by the contact or pressure sensitive adhesive. Thus a preferred laminate of the present invention might be a glass/adhesive/LR3320/adhesive/polycarbonate laminate for use as an automobile windshield.

In order to more fully and clearly illustrate the present invention, the following specific examples are presented. It is intended that the examples be considered as illustrative rather than limiting the invention disclosed and claimed herein. In the examples, all parts and percentages are on a weight basis unless otherwise specified and the polycarbonate is a 2,2-bis(4-hydroxyphenol) propane polycarbonate.

EXAMPLE 1

An 8 in. ×8 in. laminate was constructed having 100 mil glass bonded by 1 mil of V-22 adhesive to a 15 mil sheet of LR-3320 which in turn was bonded to a 5 mil polycarbonate sheet coated with 1 mil of V-22 adhesive. An aqueous solution containing 0.1% soap was applied to each interface during bonding to minimize air pockets in the laminate. The resulting laminate was optically clear and free of imperfections. Impact tests showed this particular laminate to be particularly suitable for automobile windshield applications.

EXAMPLE 2

An 8 in. ×8 in. laminate was constructed from a 5 mil film of polycarbonate having a 1 mil coat of V-22 adhesive bonded to a 15 mil sheet of LR-3320 interlayer employing the water solution of Example 1. The interlayer was in turn bonded to a 100 mil sheet of glass by a UV sensitized and UV cured epoxy. Thus this safety laminate was bonded using one layer of a contact or pressure sensitive adhesive and a second layer of UV cured adhesive. The safety laminate was optically clear and stress free at room temperature.

EXAMPLE 3

The safety laminate of Example 2 was constructed using a UV sensitized acrylic urethane ester, particularly N-n-butyl-acryloxyethyl carbonate, rather than the UV sensitized epoxy. The resulting safety laminate was optically clear and stress free at room temperature.

There are provided then by the present invention, safety laminates which are constructed by methods or processes from which are eliminated the cumbersome steps heretofore required for such construction. The invention further provides stress free safety laminates for use at room temperature or below. These laminates are suitable for use as windshields, penetration resistant laminates, windows, and the like.

What is claimed is:

1. A safety or impact resistant optically transparent laminate comprising
   (a) a plurality of laminae, at least one of which is a rigid lamina
   (b) at least one single interlayer interposed between any two of said laminae
   (c) a sufficient number of contact or pressure sensitive adhesive layers to bond all of said laminae and said interlayers, at least one of which adhesive layers is positioned adjacent to at least one of said interlayers.

2. A safety or impact resistance optically transparent laminate comprising
   (a) a rigid lamina
   (b) at least one flexible lamina
   (c) at least on single interlayers interposed between any two of said laminae
   (d) a sufficient number of contact or pressure sensitive ahesive layers to bond all of said laminae and said interlayers.

3. The safety laminate of claim 2 wherein a single interlayer is interposed between all laminae.

4. The laminate of claim 3 wherein said rigid lamina is of glass, said at least one flexible lamina is of polycarbonate, and asid interlayer is of polydiorganosiloxane-polycarbonate block copolymer.

5. A method for constructing safety or impact resistant optically transparent laminates comprising the steps of:
   (a) bringing into layered contact in such a way as to allow air to escape
      (i) a rigid lamina
      (ii) at least one flexible lamina
      (iii) a sufficient number of interlayers to have a single interlayer interposed between all laminae
      (iv) a sufficient number of contact or pressure sensitive adhesive layers to have a single such adhesive layer interposed between all laminae and interlayers;
   whereby a alyered composite is formed; and
   (b) applying sufficient pressure at ambient temperatures to said layered composite to activate said contact or pressure sensitive adhesive layerand bond the laminate.

* * * * *